United States Patent Office.

A. G. HUNTER, OF FLINT, WALES.

Letters Patent No. 73,722, dated January 28, 1868.

IMPROVEMENT IN THE MANUFACTURE OF SODA AND POTASH.

*The Schedule referred to in these Letters Patent and making part of the same.*

TO ALL WHOM IT MAY CONCERN:

Be it known that I, A. G. HUNTER, of Flint, Wales, temporarily residing in Fair Haven, in the county of New Haven, and State of Connecticut, have invented a new Improvement in the Manufacture of Soda and Potash; and I do hereby declare the following to be a full, clear, and exact description of the same.

The object of my invention is to convert chloride of sodium (common salt) into silicate and carbonate of soda and caustic soda, and chloride of potassium (muriate of potash) into silicate and carbonate of potash, and caustic potash, with the production of muriatic acid from the said chlorides. I effect this by subjecting the chloride to be decomposed, to a heat sufficient to volatilize it, and causing the chloride vapor to act upon highly-heated silica in the presence of aqueous vapor, whereby a silicate of soda or silicate of potash and muriatic acid are produced.

The muriatic acid is condensed and utilized for any of the purposes to which it is usually applied, and the silicate of soda or of potash under treatment is converted into a silicate soluble in water by fusing or boiling it with carbonate of soda or caustic soda, or with carbonate of potash or caustic potash, and the soluble silicate of soda or of potash thereby produced is dissolved in water and converted into the corresponding carbonate by treatment with carbonic acid, or into the corresponding caustic alkali, by treatment with caustic lime, baryta, or magnesia. Several forms of apparatus may be employed to expose the silica to the action of the alkaline chloride vapor. I now mention four, viz:

First. A stationary reverberatory furnace, on the hearth of which, nearest the fire, is placed the chloride to be treated, and beyond it is placed the silica or silicious mineral to be acted on, steam being admitted to the furnace at the fireplace, so that the flame, heated steam, and chloride vapor all pass together over and among the silicious mineral, thence through a condenser for the resulting muriatic acid, and thence to a chimney. The fused silicate of soda or of potash is allowed to flow out through an aperture in the furnace provided for this purpose.

Second. A revolving horizontal reverberatory furnace, in which the arrangement of materials is similar to that just described in No. 1.

Third. A vertical furnace, similar in construction to an iron-founder's cupola for melting iron, or to an iron-smelter's furnace for making pig-iron; the fuel, chloride to be treated, and silicious mineral being supplied from the top of the furnace, air and steam being admitted by tuyeres near the bottom of the furnace, the fused silicate flowing out at a suitable tap-hole near the bottom of the furnace, and the muriatic acid conducted from the furnace to a condenser. In employing this kind of furnace, the muriatic acid may be led off either from a hood covering the top, or from an opening in the side of the furnace. In the latter case, the furnace-top should be closed, either by a movable bell-shaped cover, or by enough depth of the materials to be furnaced above the muriatic acid outlet-flue, as to prevent the escape of vapors, as is ordinarily practised by iron-smelters who utilize the waste heat from their blast-furnaces for steam-boilers or air superheaters.

Fourth. A stationary or revolving horizontal reverberatory furnace, or a vertical cupola-furnace, in which the chloride to be treated is volatilized, its vapor mixed with steam and the mixed gases, viz, the furnace-flame, chloride vapor, and steam passed into a tower lined with fire-brick, and filled with the silicious mineral to be acted on, the resulting silicate flowing down and out at the bottom of the tower, and the muriatic acid led off from the top of the tower to a condenser.

It is advantageous to cause the melted silicate produced in any of these forms of furnace to flow directly into another furnace, to be fused with its corresponding caustic or carbonated alkali, or to flow directly into a solution of its corresponding caustic or carbonated alkali, to be by either of these modes converted into a soluble silicate of the alkali under treatment. It is advantageous to use, (when they can be cheaply and readily obtained,) silicious minerals containing silicate of the alkali whose chloride is to be treated, such as felspar or granite in the case of chloride of potassium.

The proportions of materials are readily determined by practical chemists, from their chemical equivalents, and from the composition of the materials from time to time treated, care being taken at all times to present sufficient silica to the chloride vapor, and sufficient caustic or carbonated alkali to render the resulting silicate soluble in water. The silica or silicate of lime, baryta, or magnesia precipitated from the soluble alkaline silicate is useful for glass-makers and potteries. The soluble alkaline silicate may be decomposed by injecting carbonic acid into an aqueous solution of the silicate till the silica is precipitated, and the solution of carbonated alkali then run off from the silica and boiled to dryness, or the solution of alkaline silicate may be decomposed by caustic lime, baryta, or magnesia, the silicate of lime, baryta, or magnesia allowed to settle, and the solution of caustic alkali run off and evaporated till sufficiently concentrated to solidify when allowed to cool.

Having thus fully described my invention, what I claim as new and useful, and desire to secure by Letters Patent, is—

The process, substantially as herein described, of decomposing chloride of sodium and chloride of potassium, for the purpose of converting them into silicated, carbonated, or caustic alkali.

A. G. HUNTER.

Witnesses:
JOHN H. SHUMWAY,
A. J. TIBBITS